US006792966B2

(12) United States Patent
Harvey

(10) Patent No.: US 6,792,966 B2
(45) Date of Patent: Sep. 21, 2004

(54) FUEL TRANSFER PUMP AND CONTROL

(75) Inventor: Richard W. Harvey, Logansport, IN (US)

(73) Assignee: Federal-Mogul World Wide, Inc., Southfield, MI (US)

(*) Notice: Subject to any disclaimer, the term of this patent is extended or adjusted under 35 U.S.C. 154(b) by 40 days.

(21) Appl. No.: 10/273,486

(22) Filed: Oct. 18, 2002

(65) Prior Publication Data

US 2003/0056824 A1 Mar. 27, 2003

Related U.S. Application Data

(63) Continuation-in-part of application No. 09/893,940, filed on Jun. 28, 2001, now Pat. No. 6,494,226, which is a continuation-in-part of application No. 09/647,645, filed on Oct. 3, 2000, now Pat. No. 6,382,225.

(51) Int. Cl.$^7$ .................... F02M 37/00; B60K 15/06
(52) U.S. Cl. .................... 137/265; 137/571; 137/580; 137/565.16; 137/565.3; 137/396; 123/514; 417/40
(58) Field of Search .................... 137/265, 571, 137/580, 565.16, 565.3, 396, 574, 395, 565.11; 123/514; 417/40

(56) References Cited

U.S. PATENT DOCUMENTS

| | | | |
|---|---|---|---|
| 3,083,720 A | 4/1963 | Cartwright et al. | |
| 3,332,435 A | 7/1967 | Anderson et al. | |
| 3,724,481 A | 4/1973 | Schutzenauer | |
| 3,981,321 A | * 9/1976 | Risse et al. | 137/255 |
| 4,018,685 A | 4/1977 | Saunders et al. | |
| 4,212,889 A | 7/1980 | Fuentevilla | |
| 4,274,380 A | 6/1981 | de Vulpillieres | |
| 4,930,537 A | 6/1990 | Farmer | |
| 4,951,699 A | 8/1990 | Lipman | |
| 5,197,443 A | 3/1993 | Hodgkins | |
| 5,197,444 A | 3/1993 | Lang et al. | |
| 5,335,704 A | 8/1994 | Haatveit | |
| 5,360,034 A | 11/1994 | Der Manuelian | |
| 5,417,239 A | 5/1995 | Ford | |
| 5,732,684 A | 3/1998 | Thompson | |
| 5,743,239 A | 4/1998 | Iwase | |
| 5,792,343 A | 8/1998 | Fujita et al. | |
| 5,960,809 A | 10/1999 | Keller | |
| 5,979,485 A | 11/1999 | Tuckey et al. | |
| 6,067,967 A | 5/2000 | Kidokoro et al. | |
| 6,283,142 B1 | 9/2001 | Wheeler et al. | |
| 6,371,153 B1 | * 4/2002 | Fischerkeller et al. | 137/265 |
| 6,382,225 B1 | 5/2002 | Tipton | |
| 2001/0035215 A1 | 11/2001 | Tipton et al. | |

FOREIGN PATENT DOCUMENTS

DE 42 27 121 A1 2/1994
FR 2640556 6/1990

OTHER PUBLICATIONS

Copy of International Search Report mailed Nov. 13, 2003.

* cited by examiner

Primary Examiner—Kevin Lee
(74) Attorney, Agent, or Firm—Howard & Howard

(57) ABSTRACT

A fuel transfer apparatus for providing fuel to a vehicle engine from a plurality of fuel tanks. A transfer pump is positioned intermediate a pair of fuel tanks and is operable to transfer fuel therebetween. Fuel is provided to the engine from a first one of the two fuel tanks. Excess fuel is returned to the first one of the two fuel tanks. When the level in the first fuel tank is less than the level in the second fuel tank by a predetermined amount, the transfer pump transfers an amount of fuel from the second fuel tank to the first fuel tank. Fuel level sensors are utilized to monitor the level of fuel in the two fuel tanks and report to a microprocessor which controls the transfer pump. The microprocessor utilized to control the transfer pump may be incorporated into the transfer pump, may be a stand alone microprocessor, or may comprise an existing vehicle circuit board such as, e.g., the electronic control module (ECM). A fuel transfer line interconnects the two tanks and is located above the two tanks.

8 Claims, 2 Drawing Sheets

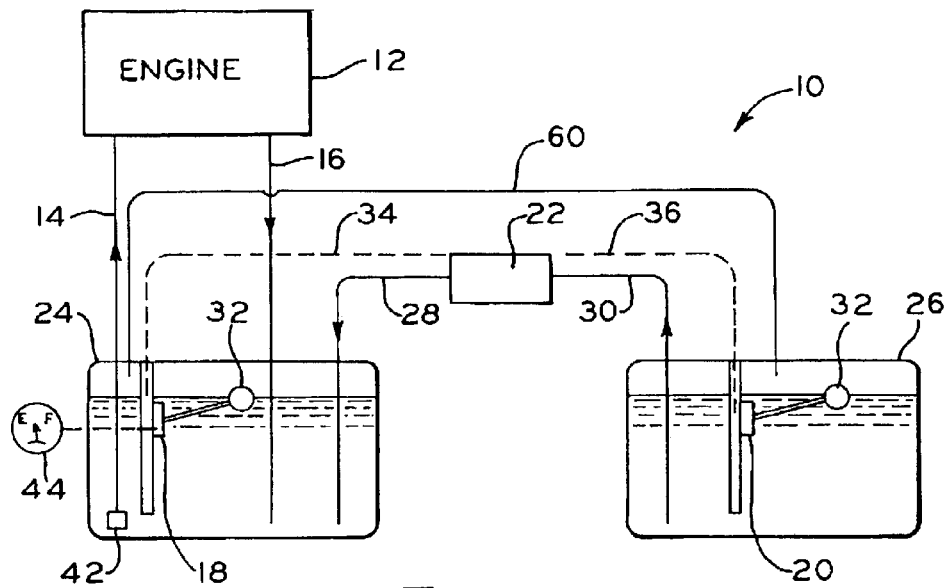
FIG_1
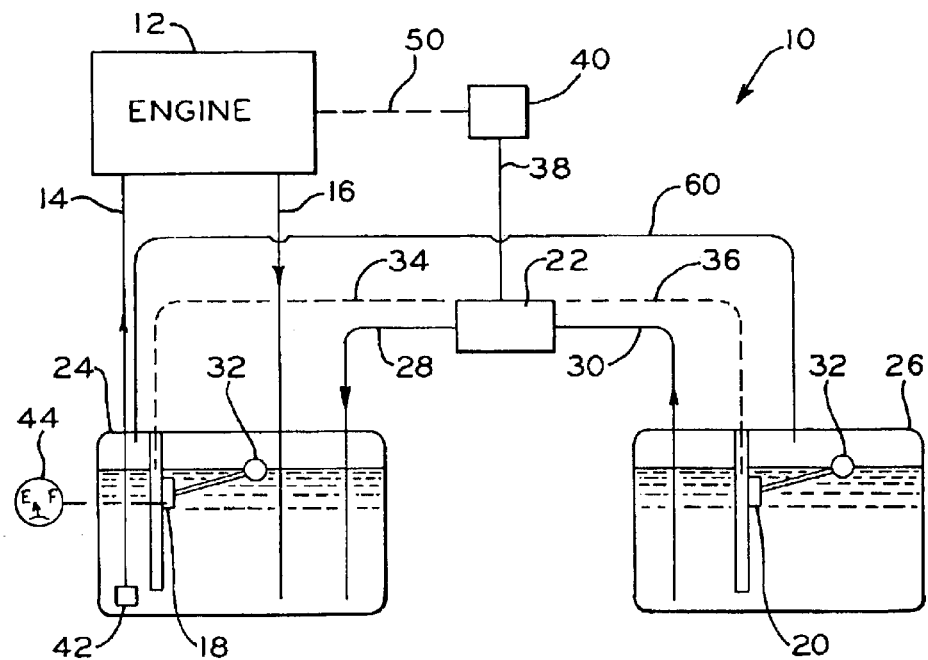
FIG_2

FUEL TRANSFER PUMP AND CONTROL

CROSS REFERENCE TO RELATED APPLICATIONS

This application is a Continuation-in-part of U.S. application Ser. No. 09/893,940, entitled FUEL TRANSFER PUMP AND CONTROL, filed on Jun. 28, 2001, now U.S. Pat. No. 6,494,226, which is a Continuation-in-part of U.S. appl. Ser. No. 09/647,645 now U.S. Pat. No. 6,382,225, entitled FUEL TRANSFER PUMP AND CONTROL, issued May 7, 2002.

BACKGROUND OF THE INVENTION

1. Field of the Invention

The present invention relates to fuel transfer from a plurality of fuel tanks to the engine of a vehicle, and more particularly, to a method and apparatus for maintaining substantially equivalent fuel levels within the plurality of fuel tanks and for ensuring that no fuel is spilled in case of any malfunction of the transfer apparatus.

2. Description of the Related Art

Vehicles such as, for example, heavy and medium duty trucks many times employ a dual fuel tank configuration providing a large fuel capacity. A fuel pump is utilized to draw fuel from the fuel tanks to the vehicle engine.

As is known in the art of internal combustion powered vehicles, fuel pumps remove more fuel from fuel tanks than is utilized in the engine so as to cool the fuel injector pump while supplying sufficient pressure to the fuel injectors. The surplus fuel which is not used by the engine is constantly returned to the fuel tank. In the dual tank configurations currently utilized, fuel is drawn from and returned to both fuel tanks simultaneously. These systems do not draw fuel evenly from both tanks nor do they return fuel evenly to both tanks. Uneven fuel draw and return can be attributed to many factors affecting fluid flow, including pressure differentials and physical attributes of the fluid distribution system including, but not limited to partial blockage of distribution piping. Spillage may occur if fuel is drawn primarily from one of the two tanks and fuel is returned primarily to the other of the two tanks.

Roads and parking areas are generally formed with a crowned configuration leading to one of the two fuel tanks being lower relative to the other. Fuel is more easily drawn from the higher tank and consequently the lower tank has less fuel drawn from it. This can exacerbate the problem of uneven fuel draw and the consequent spillage which can occur.

Uneven fuel draw and return additionally causes balance problems when one of the two fuel tanks contains significantly more fuel than the other. Hydrocarbon fuel typically weighs approximately 6 lbs. per gallon and the fuel tanks in question generally have a capacity of approximately 100 gallons. The substantial weight differential caused by an uneven amount of fuel in the two tanks can cause maintenance and other problems for the vehicle operator including, for example, uneven tire wear. An additional problem associated with the dual tank configuration occurs when one of the two tanks is emptied and air is drawn into the engine from the fuel supply line connected to the empty tank. When air is drawn into the engine, engine stall is experienced and restarting the engine is problematic.

Many vehicles utilize an engine driven fuel pump to transfer fuel from the fuel tank to the engine. As is known in the art, the output of an engine driven fuel pump is a linear function of its speed. Therefore, during engine crank, when engine speed is very low, engine driven fuel pumps create only a small amount of lift and, consequently, relatively small flow. With this in mind, engine driven fuel pumps are slow to prime. A discrete priming pump would allow for faster priming of an engine driven fuel pump. A priming pump will be particularly advantageous, for example, if the engine has run out of fuel, the fuel supply line is completely emptied by drain back occurring when the engine is not running, or a filter change has been effected. For example, during fuel filter change, the new fuel filter must be filled with fuel to complete the fuel filter change and a priming pump may be utilized to provide fuel to the newly installed fuel filter and to prime the engine driven fuel pump.

Modern vehicles conventionally utilize computer control systems to monitor and control various vehicle systems. Vehicle computer control systems typically utilize three stages: input, processing, and output. The input stage of a vehicle control system receives input from various sensors placed throughout the vehicle to monitor vehicle conditions. The processing stage of a computer control system compares the various inputs to the acceptable operational parameters stored within the memory of the computer control system. Finally, the output from a vehicle's control system signals changes in vehicle operation to bring the input parameters within the desired ranges or values. A typical vehicle control system, or electronic control module (ECM) includes various inputs and outputs. Various sensors throughout the vehicle monitor the operational parameters of the vehicle and transmit these operational parameters to the ECM, e.g., in the form of an electrical signal. Generally, the three main functions of the ECM, i.e., input, processing, and output, are performed by various sections of the ECM. For example, the input stage of the ECM is performed by an input section operable to convert signals from the various vehicle sensors into a form the ECM can effectively utilize. The processing section of the ECM generally includes a memory section having data stores indicating acceptable and/or optimum operational parameters. The processing section of the ECM generally also includes a logic section for performing necessary arithmetic calculations including comparisons of sensor inputs to acceptable parameters stored in the memory section. Furthermore, the arithmetic calculations of the logic section may be utilized to convert sensor signals into alternative forms. For example, the input to the ECM from an engine speed sensor (for example, sensing rotations of the various parts of the car's transmission) can be transformed via the logic section of the ECM into a measure of vehicle speed which can then be output via the ECM output section to, e.g., the vehicle speedometer. Furthermore, many vehicles utilize additional microprocessors placed throughout the vehicle to control various vehicle functions.

In the above-identified patent application Ser. No. 09/893, 940, a fuel transfer apparatus was disclosed including a pair of fuel tanks and a transfer pump positioned to transfer fuel between the two tanks. Fuel was provided to an engine from a first one of the two fuel tanks. Excess fuel was returned to a first one of the two fuel tanks. When the level in the first fuel tank was less than the level in the second fuel tank by a predetermined amount, the transfer pump transferred an amount of fuel from the second fuel tank to the first fuel tank. Fuel level sensors were utilized to monitor the level of fuel in the two fuel tanks and to provide inputs to a microprocessor which controlled the transfer pump.

One of the problems which could occur with such structure was that, due to system malfunction, the transfer pump could possibly continue to pump, even though the fuel levels were such that no further transfer was called for. Such malfunctions could be due to a number of reasons such as, for instance, a sender unit which "sticks" at empty or a pump switch which sticks in the "on" position. This condition could result in overfilling the main tank and resulting in a pressurized tank. When the fill cap is removed, the tank returns to its original shape, resulting in fuel being spilled and potential fuel leakage to the ground by the rollover valve vent line.

What is needed in the art is an apparatus for effectively providing fuel from a dual fuel tank configuration to an engine while maintaining a substantially equivalent volume of fuel in each of the fuel tanks, while preventing overfilling of a tank.

What is further needed in the art is an apparatus for maintaining a substantially equivalent volume of fuel in a plurality of fuel tanks, which apparatus may be configured to include an integral controller or which may utilize the existing vehicle ECM, and preventing overfilling of a tank.

What is further needed in the art is an apparatus which advantageously combines a device for maintaining a substantially equivalent level of fuel in a dual fuel tank configuration while also providing a priming pump for the engine mounted fuel pump of a vehicle, and a means to guard against overfilling of a tank.

SUMMARY OF THE INVENTION

The present invention is directed to improve upon the aforementioned fuel storage and distribution systems for vehicles having more than one fuel tank, wherein it is desired to utilize a dual fuel tank configuration in which the fuel levels in both fuel tanks remain substantially equal. The present invention provides an electric transfer pump configured to be in fluid communication with both fuel tanks. Fluid level sensors measure the fluid level in both fuel tanks and are communicatively connected to the electric transfer pump via a microprocessor. When the fluid level in one of the tanks reaches a predetermined lower level than in the other tank, the microprocessor signals the electric transfer pump to distribute fuel from the tank having the greater fuel volume to the other tank.

The microprocessor utilized in accordance with the present invention may be a stand-alone microprocessor mounted externally of the electric transfer pump, may be incorporated into the pump itself, or may comprise the vehicle ECM. Utilizing the existing vehicle ECM can be beneficial from a cost standpoint, since modern vehicles are conventionally equipped with an ECM and, therefore, an additional microprocessor is not required. However, installations utilizing a stand-alone microprocessor, or a microprocessor incorporated into the electric transfer pump may be advantageous in a retrofit situation, or in a vehicle having an ECM without an available input, or without the additional memory required to operate the electric transfer pump.

In one form of the current invention, the first of the two fuel tanks is in direct fluid communication with the engine whereby fuel is supplied to the engine from the first tank and excess fuel returning from the engine is returned to the first tank. Fuel level sensors are operatively connected to both fuel tanks. Fluid level measurements from the two fuel level sensors are communicated to a microprocessor (for the purposes of this document, "microprocessor" is meant to encompass any of the computational/control devices known in the art) which evaluates the two fuel level signals and determines whether fuel should be transferred from the second fuel tank to the first fuel tank. Fuel is transferred when the fuel level in the first fuel tank reaches a predetermined lower level than the fuel level in the second fuel tank.

To prevent the transfer pump from overfilling the main tank due to malfunction of the system, an overfill line is provided for connecting the tops of the two tanks. Thus, the two tanks will not be pressurized because the connecting line will prevent the pressurization of the tanks. The line extends above the two tanks so that, absent pressure in the main tank, no fuel will flow through the line. However, if pressure is present in the main tank and if the main tank is full, fuel will flow through the line to the other tank. Thus, the line acts as a pressure equalizer between the two tanks and also as a transfer device for transferring fuel from the overfilled main tank to the less full other tank.

In a further embodiment of the present invention, a three-way valve is positioned intermediate the transfer pump and the primary fuel tank. The three-way valve includes an inlet for receiving fuel from the transfer pump and a pair of outlets. A first one of the outlets is connected to the primary fuel tank and a second one of the outlets is connected to a fuel supply line connecting the primary fuel tank and the vehicle engine. In this embodiment, the transfer pump may advantageously be utilized to prime an engine-driven fuel pump utilized to transfer fuel from the primary fuel tank to the engine. To prime the engine driven fuel pump, the first outlet on the three-way valve is closed and the second outlet is opened, so that the transfer pump can be energized to provide fuel to the fuel supply line and thereby prime the engine-driven fuel pump. This priming feature can, e.g., be utilized at engine start or after a fuel filter change. After priming, the second outlet of the three-way valve is closed and the first outlet is opened so that the transfer pump can transfer fuel between the two fuel tanks.

An advantage of the present invention is the ability to prevent fuel spillage in a vehicle having multiple fuel tanks by eliminating the possibility that more fuel is returned to a fuel tank than is taken from the fuel tank.

Another advantage of the present invention is the ability to maintain substantially equal fuel volumes within a multiple fuel tank configuration and thus eliminate balance problems associated with unequal fuel volumes.

A further advantage of the present invention is the ability to eliminate engine stall occurring as a result of air being drawn from an empty fuel tank.

Yet another advantage of the present invention is the ability to provide an apparatus for maintaining a substantially equivalent volume of fuel in a plurality of fuel tanks, which apparatus may be configured to include an integral controller or which may utilize the existing vehicle ECM.

Yet a further advantage of the present invention is the ability to combine a device for maintaining a substantially equivalent level of fuel in a dual fuel tank configuration while also providing a priming pump for the engine mounted fuel pump of a vehicle.

Still a further advantage of the present invention is the provision of an equalizing line to ensure that, if the system malfunctions, fuel is returned from the overfilled main fuel tank to the less full tank.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 1 is a schematic representation of an embodiment of the fuel distribution system of the present invention;

FIG. 2 is a schematic representation of another embodiment of the fuel distribution system of the present invention;

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 3:
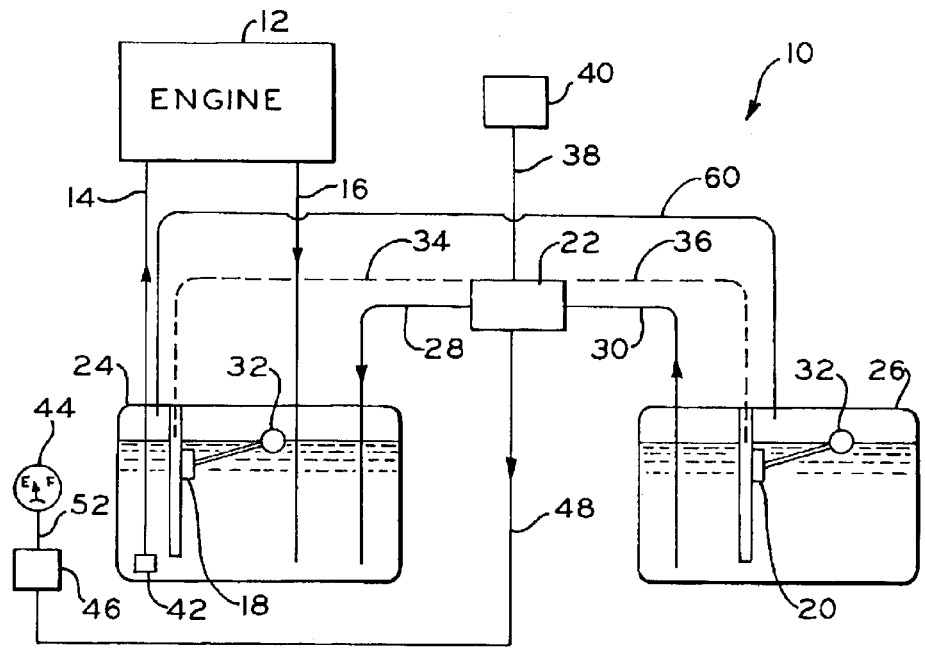
FIG. 3 is a schematic representation of a further embodiment of the fuel distribution system of the present invention.
Figure 4:
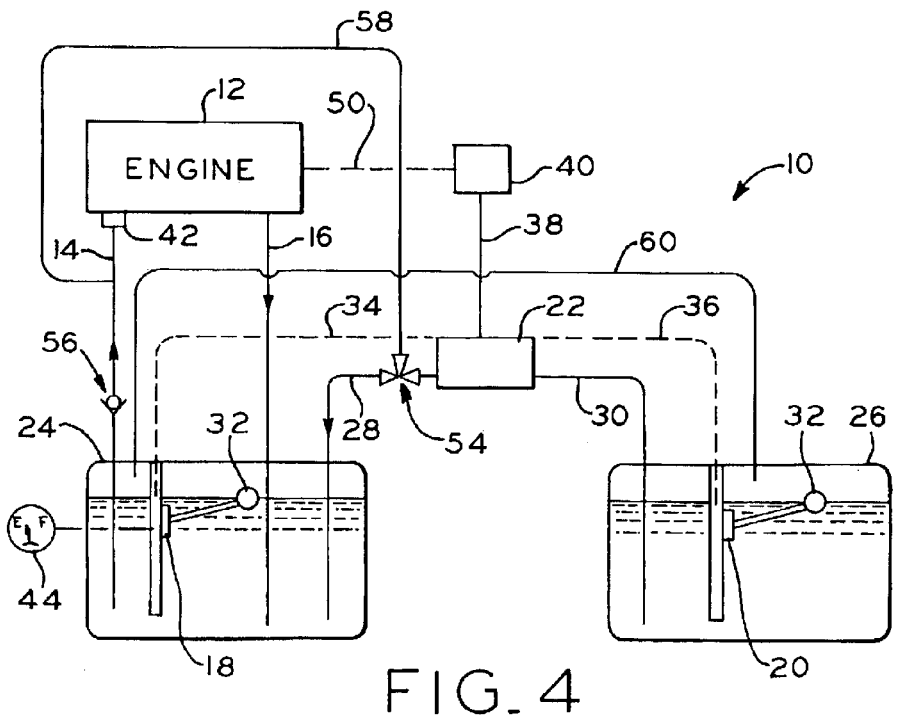
FIG. 4 is a schematic representation of yet another embodiment of the fuel distribution system of the present invention.

Referring now to the drawings and particularly to FIG. 1, there is shown fuel transfer system 10 including first tank 24, second tank 26 and transfer pump 22. Pump 22 is in fluid communication with both first tank 24 and second tank 26 and is operable to transfer fuel from second tank 26 to first tank 24. Transfer pump 22 may, for example, take the form of a pulse width modulated solenoid pump or a DC motor driven positive displacement pump. Fuel transfer system 10 further includes a microprocessor operable to control pump 22. This microprocessor may be incorporated into pump 22 as illustrated in FIG. 1, or may comprise stand alone controller 40 as illustrated in FIGS. 2–4. Furthermore, stand alone controller 40 illustrated in FIGS. 2–4 may comprise the vehicle ECM.

As depicted in FIG. 1, engine 12 is in direct fluid communication with first tank 24 via fuel supply line 14. In the exemplary embodiment illustrated in FIG. 1, fuel pump 42 is located within first tank 24 and is in direct fluid communication with supply line 14. In an alternative embodiment, pump 42 is mounted outside of first tank 24. For example, it is contemplated that pump 42 will be engine mounted, as illustrated in FIG. 4. Supply line 14 is in direct fluid communication with engine 12 and is operable to supply fuel from first tank 24 to engine 12 at the required rate. Return line 16 is in fluid communication with both engine 12 and first tank 24 and is operative to return excess fuel from engine 12 to first tank 24.

First fuel level sensor 18 is located within first tank 24 and includes float 32. Float 32 is operable in conjunction with first fuel level sensor 18 to determine the amount of fuel in first tank 24. First fuel level sensor 18 is communicatively connected to fuel gauge 44 and to transfer pump 22. The resistance value from first fuel level sensor 18 is communicated to fuel gauge 44 in a conventional manner. Fuel gauge 44 displays the volume of fuel in first tank 24 relative to full. Fuel gauge 44 is positioned on the vehicle dash or other convenient location where the driver may monitor fuel gauge 44.

Second fuel level sensor 20 is similarly located within second tank 26 and includes float 32. Second fuel level sensor 20 operates to determine the amount of fuel in second tank 26 and is communicatively connected to transfer pump 22. First and second fuel level sensors 18, 20 can be float-type sensors as depicted in FIGS. 1–3 or can be any of the many level sensors known in the art. For example, fuel level sensors utilizing a Federal-Mogul sender subassembly Part Number 228-455 can be utilized in accordance with the present invention. First and second fuel level sensors 18, 20 can be, e.g., wire wound resistance sensors.

First and second fuel level sensors 18, 20 are communicatively connected to pump 22 via first communication line 34 and second communication line 36, respectively. Pump 22 is in fluid communication with first tank 24 and second tank 26 by way of first transfer line 28 and second transfer line 30, respectively. FIG. 2 depicts an embodiment of the current invention wherein transfer pump 22 is further communicatively connected to controller 40 wherein controller 40 is located remotely from transfer pump 22. As described above, controller 40 may be integral with transfer pump 22 (as illustrated in FIG. 1), or may be remotely located, e.g., as a standalone unit or may comprise the vehicle ECM. Controller 40 is communicatively connected to first and second fuel level sensors 18, 20. This communicative connectivity may be achieved through pump 22, or through direct connection (not shown) of controller 40 to both first and second fuel level sensors 18, 20.

As further seen in FIG. 1, line 60 is provided and is connected to the tops of both fuel tanks 24 and 26 and interconnects those tanks. Line 60 is located above both fuel tanks. Thus, if transfer pump 22 continues to operate due to a malfunction of the system, and continues to transfer fuel into tank 24 so that it becomes full and pressurized, fuel will flow through line 60 and return to tank 26, thereby preventing pressurization of tank 24 and preventing overfilling of tank 24.

In operation, the controller of the current invention works to maintain a substantially equivalent fuel level in first tank 24 and second tank 26. As the engine uses fuel, the fuel level in first tank 24 decreases. As the fuel level in first tank 24 drops below the fuel level in second tank 26 by a predetermined amount, e.g., one inch, the controller signals transfer pump 22 to transfer fuel until the fuel level in first tank 24 is substantially equal to the fuel level in second tank 26. It is further contemplated that the controller could deliver a predetermined amount of fuel from second tank 26 to first tank 24 in response to the fuel level in first tank 24 dropping below the fuel level in second tank 26 by a predetermined amount, e.g., one inch. The fuel level in first tank 24 is sensed by first fuel sensor 18 and is thereafter communicated to a controller located within transfer pump 22 (FIG. 1) or to a remotely located controller 40 (FIGS. 2–4). The fuel level of second tank 26 is similarly sensed by second fuel level sensor 20 and communicated to the controller. The controller evaluates the communicated fuel level values and actuates pump 22 as necessary. Pump 22 has sufficient flow resistance (via an internal check valve (not shown)) to prohibit siphoning from second tank 26 to first tank 24.

Referring now to FIGS. 2 and 4, electrical connection 50 can be made between engine 12 and controller 40 to provide an input to controller 40 indicating that the engine is either running or not running. The signal provided on line 50 could be an indication of engine rpms, oil pressure, ignition status, or the like. Thus, a signal provided on line 50 from the engine to controller 40 could cause controller 40 to either enable or disable pump 22 depending on the transmitted signal. For instance, pump 22 should not operate when the engine is not running to avoid pumping fuel on the ground in a worst case scenario such as, e.g., an accident which has ruptured first fuel tank 24.

As can be seen in FIGS. 2 and 4, a line 60 is also connected to the tops of both fuel tanks and interconnects those tanks. Thus, if a system failure occurs so that transfer pump 22 continues to operate, fuel will be transferred from an overfull tank 24 through line 60 to the less full tank 26 and the pressures in the two tanks are also equalized.

In a further embodiment of the present invention (illustrated in FIG. 3), controller 40 is connected to a fuel gauge and is operable to utilize the fuel level values from first and second fuel level sensors 18, 20 to determine the total amount of fuel available. In one such embodiment, controller 40 performs an additive function to sum the fuel levels in the two tanks to determine the total fuel remaining in the tanks. Controller 40 then compares the total fuel value to the total tank capacity to determine an output indicative of the fraction of the two fuel tanks containing fuel relative to full. For example, if both tanks are filled to half capacity, then the microprocessor will determine an overall fuel level value of half full. Similarly, if one tank is three-quarters full and the other tank is one-quarter full, the microprocessor will determine an overall value of half full for the two fuel tanks. This determination could be made by adding the volume of the two fuel tanks and comparing this value to the capacity of the two fuel tanks as described above, or could be accomplished by computing a weighted average of the volume values for each tank relative to its capacity. Controller 40 will be configured to provide an appropriate output for the relevant vehicle fuel gauge. In this way, the apparatus of the present invention advantageously provides an accurate method for measuring fuel volume in a vehicle having a plurality of fuel tanks.

Referring again to FIG. 3, controller 40 is communicatively connected to stepper motor 46 via pump 22 and fourth communication line 48. Stepper motor 46 is further mechanically coupled to fuel gauge 44 via step connection 52. Stepper motor 46 actuates fuel gauge 44 in response to the fuel level value determined by controller 40, as described above. Stepper motor 46 may be integral with fuel gauge 44. This mechanically actuated fuel gauge is provided by way of example only. As stated above, a controller in accordance with the present invention may be configured to provide an output (e.g., a digital or analog signal) for receipt by a variety of fuel gauges. For example, some modern vehicles include a processor in the vehicle dashboard to control various gauges located on the dashboard. In such a vehicle, the controller of the current invention would be configured to provide either an analog or a digital signal (depending upon the configuration of the dashboard processor) to the dashboard processor which would drive the fuel gauge based upon this signal. Furthermore, controller 40 in accordance with the present invention may be configured to provide a digital or analog signal indicative of the computed fuel level value directly to a fuel gauge operable to receive such an output.

Line 60 interconnects the tops of tanks 24 and 26 so that, if a malfunction of the fuel transfer system occurs, and pump 22 continues to operate and transfer fuel to tank 24, fuel can flow through the line 60 and return to fuel tank 26 to prevent overfilling of tank 24.

First tank 24 and second tank 26 can contain baffles (not shown) which are operative to reduce the sloshing of fuel while the vehicle is in motion. However, baffles do not completely eliminate fuel slosh and therefore electronic dampening is provided. Electronic dampening is provided in the current invention by utilizing average fuel level measurements from first and second fuel level sensors 18, 20. A preset time frame over which fuel level values are averaged is entered into the controller. Average fuel levels over this preset time frame are then compared and utilized to control pump 22 (and fuel gauge 44, in the embodiment illustrated in FIG. 3). In this way excessively high or excessively low fuel values due to slosh will not cause actuation of pump 22 and lead to unnecessary transfer of fuel.

In one exemplary embodiment of the current invention, controller 40 is integral with pump 22, with pump 22 having five wires extending therefrom. These five wires would be operable to connect the pump to 1) ground, 2) a power source, 3) first fuel level sensor 18, 4) second fuel level sensor 20, and 5) electrical connection 50 between engine 12 and controller 40 (discussed above). A pump in accordance with this exemplary embodiment of the present invention could then be retrofit to a vehicle having multiple fuel tanks with fluid lines positioned therebetween and a fluid level sensor operably positioned in each fuel tank. The pump of the current invention would be positioned between the fuel line connecting a pair of fuel tanks, connected to ground and power as well as the two fuel level gauges and, optionally, to an electrical connection providing a signal indicative of engine operation as discussed above. Furthermore, a pump in accordance with the present invention may include a sixth wire or a digital connection for communicating a fuel level value to a fuel gauge as discussed above.

Controller 40 in accordance with the present invention will further include safety programming to discontinue transfer pumping if certain conditions are met. For example, if transfer pump 22 operates for an extended period of time, e.g., one minute, and first fuel level sensor 18 does not indicate a rise in fuel level in first fuel tank 24, then controller 40 will discontinue operation of pump 22. In this way, a hangup in first level sensor 18 will not cause transfer pump 22 to overfill first fuel tank 24. Furthermore, a hangup in second fuel level sensor 20 can be detected if transfer pump 22 operates for a period of time, e.g., one minute, and the fuel level value provided by second fuel level sensor 20 does not decrease. Additionally, controller 40 will monitor the rate of fuel decrease in first fuel tank 24 and discontinue pumping between second tank and first tank 24 if first tank 24 experiences an inappropriately high rate of fuel loss (i.e., a rate of fuel loss greater than that which could be required by engine 12). In this way, if first fuel tank 24 is experiencing fuel loss for any reason, transfer pump 22 will not exacerbate the problem by providing the fuel contained in second fuel tank 26 to first fuel tank 24.

In a further embodiment of the present invention, transfer pump 22 can be utilized as a priming pump for engine driven fuel pump 42. As illustrated in FIG. 4, transfer pump 22 can be configured to prime engine driven fuel pump 42 by inserting three-way valve 54 in first transfer line 28 as well as by providing check valve 56 in fuel supply line 14. Three-way valve 54 includes an entrance connected to transfer pump 22 as well as a pair of exits. A first exit from three-way valve 54 connects to first transfer line 28 and thereafter to first tank 24. Similarly, a second exit from three way valve 54 connects to priming line 58 and thereafter to fuel supply line 14 and engine driven fuel pump 42. In one exemplary embodiment, three-way valve 54 comprises a solenoid actuated valve.

While illustrated as a discrete unit in FIG. 4, three-way valve 54 could be built into transfer pump 22, with transfer pump 22 having one inlet and two outlets. It is further contemplated that transfer pump 22 could be directly mounted to first fuel tank 24. In such an embodiment, three-way valve 54 could advantageously be incorporated into transfer pump 22 so that, one outlet from three way valve 54 would provide direct access to first fuel tank 24. The second outlet from three-way valve 54 can further include an integral check valve and be adapted for direct connection to fuel supply line 14. In this way, priming line 58 as well as first transfer line 28 could be eliminated. Actuation of three-way valve 54 is controlled by controller 40.

A configuration such as the one illustrated in FIG. 4 in which fuel transfer pump 22 can be utilized as a priming pump for engine driven fuel pump 42 is advantageous since a priming feature can be provided without adding a discrete priming pump. As is known in the art, the output of an engine driven fuel pump is a linear function of its speed. Therefore, during engine crank, when engine speed is very low, engine driven fuel pumps create only a small amount of lift and, consequently, relatively small flow. With this in mind, engine driven fuel pump 42 will be slow to prime. A priming pump would therefore allow for faster priming of an engine driven fuel pump. Priming of engine driven fuel pump 42 will be particularly advantageous, for example, if the engine has run out of fuel, fuel supply line 14 is completely emptied by drain back occurring when the engine is not running, or a filter change has been effected. For example, during a fuel filter change, the new fuel filter must be filled with fuel to complete the fuel filter change. Non-filtered fuel may be introduced to the clean side of the filter to fill the filter with fuel. If this is done, an amount of possibly contaminated (i.e., non-filtered) fuel will disadvantageously be transmitted to the vehicle's fuel injector system. To avoid this problem, a manual switch could be positioned adjacent the fuel filter so that upon replacement of the fuel filter, the manual switch could be actuated to close the outlet on three-way valve 54 which allows fuel flow to primary fuel tank 24 while also opening the outlet on three-way valve 54 allowing fuel flow to fuel supply line 14 (and consequently to the fuel filter) and thereafter operating the transfer pump 22 to introduce fuel into the newly changed fuel filter and to prime engine driven fuel pump 42. Such a manually actuated priming switch would, of course, be connected to controller 40. As is conventional, an air bleed line will be utilized to bleed the air out of the system when engine driven fuel pump 42 is primed.

It is further contemplated that controller 40 will place three-way valve 54 and fuel transfer pump 22 in priming configuration responsive to a signal that the ignition key has been turned to start the vehicle. In such an embodiment, electrical connection 50 will be connected to the vehicle's ignition switch to provide information to controller 40 that the vehicle ignition switch has been enabled. This signal may also be utilized in conjunction with the aforementioned safety feature of the present invention which disables pump 22 from operation unless a signal on electrical connection 50 indicates that the vehicle is operating. In one exemplary embodiment, transfer pump 22 will be energized to prime engine driven fuel pump 42 at vehicle "key-up" (i.e., when the vehicle ignition key is turned). In this embodiment, pump 22 will be energized when the ignition key achieves a position just prior to initialization of the vehicle starter. In this embodiment, pump 22 will be energized for approximately 10 to 15 seconds to prime engine driven fuel pump 42 at engine start up.

As stated above, controller 40 could be integrated into pump 22. Furthermore, three-way valve 54 as well as check valve 56 can be incorporated into pump 22. If valves 54, 56 as well as controller 40 are incorporated into pump 22, this unit may be easily retrofit to a vehicle having a plurality of fuel tanks to provide a fuel transfer pump and priming pump as described above. The connections for controller 40 utilized to operate pump 22 in its fuel transfer configuration are outlined above. If pump 22 is also utilized as a priming pump, the connections will only require modification if a manually actuatable filter switch is utilized, or if electrical connection 50 does not provide an input indicative of the position of the ignition switch as the enable signal discussed above.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fuel transfer apparatus for providing fuel to an engine, comprising:

a first fuel tank;

a fuel supply line, said fuel supply line in direct fluid communication with said first fuel tank and the engine;

a fuel return line, said fuel return line in direct fluid communication with the engine and said first fuel tank;

a first fuel level sensor operatively associated with said first tank;

a second fuel tank;

a second fuel level sensor operatively associated with said second tank;

a pump in direct fluid communication with said first fuel tank and said second fuel tank, said pump operative to transfer fuel from said second fuel tank to said first fuel tank;

a fuel gauge;

a controller operatively connected to said first and second fuel level sensors and said fuel gauge whereby the total amount of fuel in said first and second tanks is computed by said controller and is indicated by said gauge; and a fuel transfer line interconnecting said first and second fuel tanks and located above both said fuel tanks.

2. The fuel transfer apparatus of claim 1 wherein said fuel transfer line is connected to the tops of said two fuel tanks.

3. A fuel transfer apparatus for providing fuel to an engine, comprising:

a first fuel tank having a first fuel level sensor operably associated therewith;

a fuel supply line, said fuel supply line in direct fluid communication with said first fuel tank and the engine;

a second fuel tank having a second fuel level sensor operably associated therewith;

a fuel return line, said fuel return line in direct fluid communication with the engine and one of said first and said second fuel tanks;

a pump in fluid communication with said first fuel tank and said second fuel tank, said pump operable to transfer fuel from one of said first and said second fuel tanks to the other of said first and said second fuel tanks;

a microprocessor communicatively connected to said first fuel level sensor and said second fuel level sensor, said microprocessor further communicatively connected to said pump, said microprocessor operable to compare a first fuel level value provided by said first fuel level sensor with a second fuel level value provided by said second fuel level sensor, said microprocessor signaling said pump to transfer fuel from said second fuel tank to said first fuel tank when said first fuel level value becomes less than said second fuel level value by a predetermined amount; and a fuel transfer line interconnecting said first and second fuel tanks, said fuel transfer line located above both said fuel tanks.

4. The fuel transfer apparatus of claim 3, wherein said microprocessor is integral with said pump.

5. The fuel transfer apparatus of claim 3, wherein said microprocessor comprises a vehicle electronic control module.

6. The fuel transfer apparatus of claim 3, wherein said microprocessor is operable to output a fuel level value to a fuel gauge, said fuel level value being computed based upon both said first fuel level value and said second fuel level value.

7. The fuel transfer apparatus of claim 3, wherein said microprocessor is communicatively connected to the vehicle engine, and wherein said microprocessor thereby receives an indication of the operational status of the engine, and whereby the microprocessor is operable to discontinue operation of said pump responsive to a signal that the engine is not operating.

8. A fuel transfer apparatus for providing fuel to an engine, comprising:

a first fuel tank having a first fuel level sensor operably associated therewith;

a fuel supply line, said fuel supply line in direct fluid communication with said first fuel tank and the engine;

a second fuel tank having a second fuel level sensor operably associated therewith;

a fuel return line, said fuel return line in direct fluid communication with the engine and one of said first and said second fuel tanks;

a pump in fluid communication with said first fuel tank and said second fuel tank, said pump operable to transfer fuel from one of said first and said fuel tanks to the other of said first and said second fuel tanks;

a microprocessor communicatively connected to said first fuel level sensor and said second fuel level sensor, said microprocessor further communicatively connected to said pump, said microprocessor operable to compare a first fuel level value provided by said first fuel level sensor with a second fuel level value provided by said second fuel level sensor, said microprocessor signaling said pump to transfer fuel from said second fuel tank to said first fuel tank when said first fuel level value becomes less than said second fuel level value by a predetermined amount;

a three-way valve positioned intermediate said pump and said first fuel tank, said three-way valve including an inlet operably connected to said pump, said three-way valve further including a first outlet in fluid communication with said first fuel tank and a second outlet in fluid communication with said fuel supply line, said three-way valve communicatively connected to said microprocessor; and a fuel transfer line interconnecting said first and second fuel tanks, said fuel line located above both said fuel tanks.

* * * * *